United States Patent [19]

Jorgensen, Jr.

[11] Patent Number: 4,920,176
[45] Date of Patent: Apr. 24, 1990

[54] NITRILE EMULSION POLYMERS HAVING IMPROVED ADHESION PROPERTIES

[75] Inventor: August H. Jorgensen, Jr., Avon Lake, Ohio

[73] Assignee: The B. F. Goodrich Company, Akron, Ohio

[21] Appl. No.: 279,680

[22] Filed: Dec. 5, 1988

[51] Int. Cl.$^5$ ............................................. C08L 91/02
[52] U.S. Cl. ................................. 525/185; 525/187; 528/492
[58] Field of Search ................. 525/185, 187; 528/492

[56] References Cited

U.S. PATENT DOCUMENTS 4,179,549 12/1979 Buriks et al. ........................ 525/296
4,284,737 8/1981 Kruse et al. ........................ 528/492

Primary Examiner—Allan M. Lieberman
Attorney, Agent, or Firm—Daniel J. Hudak; Nestor W. Shust

[57] ABSTRACT

Nitrile rubber emulsion latexes containing anionic emulsifying aids such as surfactants are treated with large amounts of cationic polymeric coagulants to form innocuous water insoluble residues. The polymeric coagulants chemically react with the anionic emulsifying aids by forming polymer adducts whereby the adducts are physically maintained in the nitrile rubber. The need for complete or thorough washing steps, which is generally tedious, expensive, and commercially impractical, is thus reduced or eliminated. Moreover, the dried latex particles have been found to have improved properties such as water resistance, adhesion, and the like.

5 Claims, No Drawings

NITRILE EMULSION POLYMERS HAVING IMPROVED ADHESION PROPERTIES

FIELD OF THE INVENTION

The present invention relates to nitrile rubber emulsion latex polymers and to a method of preparation thereof wherein various emulsifying aids such as anionic surfactants are chemically reacted with a cationic polymer to render the same innocuous as well as insoluble in water.

BACKGROUND

Heretofore, surfactants, electrolytes, and other anionic emulsifying aids were necessarily utilized in the polymerization of nitrile rubber latex compositions. However, once the polymer was formed, washing or other removal steps were required to remove as much of the emulsifying aids as possible. Significant amounts remained, however, and could only be further reduced by tedious, expensive and complicated steps such as multiple washing, filtration, solvent extraction, and the like. From a commercial aspect, a nearly complete removal was impractical.

SUMMARY OF THE INVENTION

Various cationic coagulant polymers such as condensation products of epichlorohydrin and an amine which is subsequently quaternized or various quaternary ammonium compounds are introduced into a nitrile rubber latex where the cationic polymer chemically reacts with the various anionic emulsifying aids such as surfactants, electrolytes, and the like. The various anionic emulsifying aids are conveniently tied up or neutralized and generally exist within the agglomerated latex polymer particles as opposed to on the surface thereof so that dried latex particles have improved properties such as improved adhesion, better electrical resistance, reduced fouling of molds during the manufacture of parts, non-interference with cure systems, and the like. The amount of the cationic polymeric coagulants is generally a stoichiometric weight equivalent to the total amount of the anionic components in the latex so as to generally form innocuous water insoluble residues.

DETAILED DESCRIPTION OF THE INVENTION

The nitrile rubber emulsion latex of the present invention generally contains conventional nitrile rubbers known to the art and to the literature, that is rubbers generally made from one or more monomers of acrylonitrile or an alkyl derivative thereof with one or more conjugated dienes and optionally one or more monomers of acrylic acid, or an ester thereof, or a dicarboxylic acid. Examples of acrylonitrile monomers or alkyl derivatives thereof include acrylonitrile and alkyl derivatives thereof having from 1 to 4 carbon atoms such as methacrylonitrile, and the like. The amount of the acrylonitrile or alkyl derivative monomers is from about 0 or 1 percent to about 50 percent by weight and preferably from about 25 percent to about 45 percent by weight based upon the total weight of the nitrile rubber forming monomers. That is, although an acrylonitrile or monomer or derivative thereof is generally utilized, it need not always be utilized as known to those skilled in the art.

The conjugated diene monomers generally have from 4 to 10 carbon atoms with from 4 to 6 carbon atoms being preferred. Examples of specific conjugated diene monomers include butadiene, isoprene, hexadiene, and the like. The amount of such conjugated dienes is generally from about 50 percent to about 99 percent by weight and preferably from about 55 percent to about 75 percent by weight based upon the total weight of the nitrile rubber forming monomers.

The nitrile rubbers of the present invention can also contain various optional comonomers as known to those skilled in the art as well as to the literature. Such optional comonomers generally include acrylic acid or various esters thereof, dicarboxylic acids, or combinations thereof. The acrylic acid or the esters thereof can generally be represented by the formula

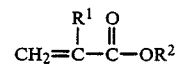

where $R^1$ is hydrogen or an alkyl having from 1 to 4 carbon atoms, and wherein $R^2$ is hydrogen, or (a) a nitrile containing ester wherein the ester portion contains a total of from 1 to 8 carbon atoms, (b) a hydroxyl containing ester wherein the ester portion contains a total of from 1 to 8 carbon atoms, (c) an unsaturated epoxy containing monomer which contains a total of from 3 to 12 carbon atoms, or (d) or combinations thereof. When $R^2$ is hydrogen, examples of suitable acids include acrylic acid, methacrylic acid, and the like. When $R^2$ is a nitrile containing ester, examples of suitable optional monomers include cyanoethyl acrylate, cyanoethyl methacrylate, cyanobutyl ether acrylates, and the like. Examples of suitable hydroxyl containing esters include hydroxy ethyl methacrylate, hydroxy propyl methacrylate, hydroxy ethyl acrylate, and the like. Examples of suitable epoxy containing monomers include glycidyl methacrylate, glycidyl acrylate, allyl glycidyl ether, and the like. The dicarboxylic acids generally contain from 3 to about 10 carbon atoms and specific examples include maleic acid, fumaric acid, itaconic acid, and the like.

When utilized, the amount of the above-noted optional monomers is generally from about 0.1 to about 25 percent by weight and preferably from about 4 to about 12 percent by weight based upon the total weight of the nitrile rubber forming monomers. As noted hereinabove, although generally utilized, an acrylonitrile monomer or an alkyl derivative thereof need not always be utilized in association with the conjugated diene monomers. In such an event, one or more of the above-noted optional monomers are utilized.

The nitrile rubber latex is made in a conventional manner. That is, the above-noted monomers are added to suitable amounts of water in a polymerization vessel along with one or more conventional ingredients and polymerized. The amount of polymerized solids or particles is generally from about 15 percent to about 50 percent with from about 25 to about 35 percent by weight being desired. The temperature of polymerization is generally from about 5° C. to about 80° C. with from about 30° C. to about 40° C. being preferred. Typically in excess of 60 percent and usually from about 70 percent to about 95 percent conversion is obtained with from about 80 percent to about 85 percent conversion being preferred. The polymerization is generally initiated by free radical catalysts which are utilized in conventional amounts. Examples of such catalysts include organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

Inasmuch as the nitrile rubbers are prepared via an emulsion latex polymerization route, anionic emulsifying aids are utilized. Thus, various conventional anionic surfactants known to the art as well as to the literature are utilized. Generally, any suitable anionic surfactant can be utilized such as those set forth in McCutcheons, "Detergents and Emulsifiers," 1978, North American Edition, Published by McCutcheon's Division, MC Publishing Corp., Glen Rock, N.J., U.S.A., as well as the various subsequent editions thereof, all of which are hereby fully incorporated by reference. Desirably, various conventional soaps or detergents are utilized such as a sodium alkyl sulfate, wherein the alkyl has from 8 to 22 carbon atoms such as sodium lauryl sulfate, sodium stearyl sulfate, and the like, as well as various sodium alkyl benzene sulfonates, wherein the alkyl has from 8 to 22 carbon atoms such as sodium dodecyl benzene sulfonate, and the like. Other anionic surfactants include sulfosuccinates and disulfonated alkyl benzene derivatives having a total of from 8 to 22 carbon atoms. Various phenyl type phosphates can also be utilized. Yet other anionic surfactants include various fatty acid salts having from 12 to 22 carbon atoms as well as various rosin acid salts wherein the salt portion is generally lithium, sodium, potassium, ammonium, magnesium, and the like. The selection of the anionic surfactant generally depends on the pH of the polymerization action. Hence, fatty acid salts and rosin acid salts are not utilized at low pH values.

The amount of the surfactant can vary depending upon the size of nitrile rubber particles desired, but typically is from about 1 percent to about 6 percent and desirably from about 2 percent to about 3 percent by weight for every 100 parts by weight of the nitrile rubber forming monomers.

Other anionic emulsifying aids are various anionic electrolytes which control particle size by controlling the solubility of the soap. Examples of various conventional electrolytes generally include sodium, potassium, or ammonium naphthalene sulfonates. Other suitable electrolytes include sodium sulfate, sodium carbonate, sodium chloride, potassium carbonate, and the like. The amount of electrolyte is generally from about 0.1 to about 1.0 parts by weight with from about 0.2 to about 0.5 parts by weight for every 100 parts by weight of the nitrile rubber forming monomers Molecular weight modifiers are also utilized to maintain the molecular weight within desirable limits as otherwise the viscosity of the polymer would be exceedingly high for subsequent handling, processing, and the like. Generally, known conventional molecular weight modifiers can be utilized such as various mercaptans which have from about 8 to about 22 carbon atoms, generally in the form of an alkyl group. Various sulfide compounds can also be utilized such as diisopropylxanthogendisulfide and di-sec-butylxanthogendisulfide. The amount of the molecular modifiers is generally an effective amount such that the Mooney viscosity, that is ML-4' @ 100° C. is from about 10 to about 120 and desirably from about 20 to about 80.

Yet another conventional emulsion latex additive is various short stop agents which are added generally to stop the polymerization and to tie up and react with residual catalysts. The amount of the short stop agents is from about 0.05 to about 1.0 parts by weight per 100 parts by weight of said nitrile rubber forming monomers. Examples of specific short stop agents include hydroxyl ammonium sulfate, hydroquinone and derivatives thereof, e.g., ditertiaryamylhydroquinone, various carbamate salts such as sodium diethyldithiocarbamate, various hydroxyl amine salts, and the like. Various antioxidants can be added and such are known to the art as well as to the literature including various phenolic type antioxidants such as ditertbutylparacresol, various diphenylamine antioxidants such as octylated diphenylamine, various phosphite antioxidants such as trisnonyl phenyl phosphite, and the like. Once the short stop has been added to the latex solution, excess monomer is stripped from the resultant latex, as for example by steam.

According to the concepts of the present invention, a cationic coagulant polymer is utilized to coagulate the anionic emulsifying aids such as the various anionic surfactants and the various anionic electrolytes utilized. Polymeric cationic type coagulants are utilized according to the present invention inasmuch as they have a positive site which generally reacts with the negative or anionic site of the surfactant, electrolyte, etc., and thereby neutralize the same and render it innocuous. That is, according to the concepts of the present invention, the anionic emulsifying aids are not physically removed but rather are chemically reacted with a cationic polymeric coagulant to form an adduct which is generally dispersed throughout the nitrile particle.

An important aspect of the present invention is that large stoichiometrically equivalent amounts of cationic polymeric coagulants are utilized. That is, large weight equivalents are required in order to yield a nitrile rubber having improved properties. Generally, from about 0.75 to about 1.5 weight equivalents, desirably from about 0.85 to about 1.25, and preferably from about 0.95 to about 1.05 weight equivalents of the cationic polymeric coagulant is utilized for every weight equivalent of said anionic emulsifying aids. Equivalent weight amounts less than those set forth herein do not result in effective neutralization, tying up, or negate the effect which the various anionic emulsifying aids have upon the properties of the dried nitrile rubber particles.

The cationic polymeric coagulants utilized in the present invention generally contain a tetravalent nitrogen and are sometimes referred to as polyquats. Cationicity of the quaternary nitrogen is generally independent of pH, although other parts of the polymer molecule may exhibit sensitivity to pH such as hydrolysis of ester linkages. Typically, cationic polymers are prepared either by quaternization of poly(alkylene polyamines), poly(hydroxyalkylene polyamines), or poly(carbonylalkylene polyamine) with alkyl halides or sulfates, or by step-growth polymerization from dialkylamines, tetraalkyl amines, or derivatives thereof, with suitable bifunctional alkylating agents, and with or without small amounts of polyfunctional primary amines (such as ammonia, ethylene diamines, and others) for molecular weight enhancement. Polyamines produced from ammonia and ethylene dichloride, quaternized with methyl chloride, and polyquaternaries produced directly from dimethylamine and 1-chloro-2,3-epoxypropane are generally of commercial significance. Epichlorohydrin reacts with ammonia and primary, secondary, or polyfunctional amines to form polyamines or polyquats. The polyamines can be subsequently quaternized to yield a cationic polymeric coagulant of the present invention. As known to those skilled in the art and to the literature, literally hundreds of cationic polymeric coagulants exist and generally the same can be utilized in the present invention. Examples of specific polymeric cationic coagulants include poly(2-hydroxypropyl-1-N-methylammonium chloride), poly(2-hydroxypropyl-1,1-N-dimethylammonium chloride), poly(diallyldimethylammonium chloride), poly(N,N-dimethylaminoethyl methacrylate) quaternized, and a quaternized polymer of epichlorohydrin and a dialkylamine wherein the alkyl group has from 1 to 5 carbon atoms with methyl being preferred. The method of preparing cationic polymeric coagulants, general types of such compounds as well as specific individual compounds are set forth in the following documents which are hereby fully incorporated by reference with regard to all aspects thereof:

*Encyclopedia of Polymer Science and Technology*, John Wiley & Sons, New York, 1987, Volume 11, 2nd Edition, pages 489–503.

*Encyclopedia of Polymer Science and Technology*, John Wiley & Sons, New York, 1987, Volume 7, 2nd Edition, pages 211–229.

*Kirk Othermer's Encyclopedia of Chemical Technology*, 3rd Edition, Volume 10, John Wiley & Sons, New York, 1980, pages 489–523.

A text entitled *Commercial Organic Flocculants*, Josef Vostrcil and Frantisek Juracka, Noyes Data Corporation, Park Ridge, N.J., 1976, in its entirety.

The cationic polymeric coagulants utilized in the present invention generally have a molecular weight of from about 1,000 to about 10,000,000.

According to the present invention, the cationic polymeric coagulant treated nitrile rubber latex generally results in a slurry of rubber crumbs in a clear aqueous liquid. The crumbs contain the various anionic emulsifying aids physically incorporated therein. Such crumbs can be separated in any conventional manner as by filtering. Inasmuch as the anionic emulsifying aids have been rendered innocuous, multiple washing steps or other expensive, tedious process steps such as solvent extraction are not utilized.

The nitrile rubbers of the present invention once dried as by conventional means, have improved properties such as good water resistance, good adhesion properties, non-interference with cure systems when cured, reduce fouling of molds during the manufacture of parts, improved electrical insulating properties, and the like. Such polymers can accordingly be utilized as adhesives, that is polymeric adhesives, binders, films, e.g., electrical insulating films, coatings such as for electrical circuit boards along with other conventional coating additives and fillers known to the art and to the literature, and the like. Suitable adhesive uses include metal-to-metal adhesion, metal-to-fabric adhesion, metal-to-plastic adhesion, and the like.

The invention will be better understood by reference to the following examples.

EXAMPLE 1

Various nitrile rubbers were prepared in a conventional or standard manner well known to the art and to the literature utilizing conventional or standard anionic emulsifying aids. The same nitrile rubber emulsion latex was coagulated with brine or calcium chloride and tested for the amount of remaining sodium, calcium, or potassium within the rubber particles. The results are set forth in Table I.

TABLE I

| | | AAS Analyses of Nitrile Rubbers | Na ppm | Ca ppm | K ppm |
|---|---|---|---|---|---|
| | | COAGULANT | | | |
| A | Nitrile Rubber (made from 67 percent by weight of Butadiene and 33 percent by weight of Acrylonitrile)[1] | K fatty acid emulsifier Coag with Brine | 1049 1017 | 1028 1032 | 20 20 |
| B | Nitrile Rubber (made from 67 percent by weight of Butadiene and 33 percent by weight of Acrylonitrile)[1] | K fatty acid emulsifier Coag with Brine | 840 940 | 1083 1034 | 21 20 |
| C | Nitrile Rubber (made from 67 percent by weight of Butadiene and 33 percent by weight of Acrylonitrile)[1] | K fatty acid emulsifier Coag with Brine | 642 683 | 753 756 | 18 19 |
| D | Nitrile Rubber (made from 67 percent by weight of Butadiene and 33 percent by weight of Acrylonitrile)[2] | Nalas emulsifier Coag with CaCl$_2$ | 288 289 | 2009 2072 | 2 7 |

[1]Hycar 1022 manufactured by The BF Goodrich Company
[2]Hycar 1052 manufactured by The BF Goodrich Company As apparent from Table I, significant high amount of sodium, calcium, and potassium remained within the rubber particles when conventional inorganic coagulants were utilized.

Table II sets forth the use of various conventional coagulants (Example F-H) and a cationic polymeric coagulant of the present invention, specifically, a quaternized polymer made from epichlorohydrin and dimethylamine, methylamine, that is, ECH/DMA QUAT.

TABLE II

The Composition of the Ash in Nitrile Rubber

| | RUBBER | COAGULANT | % ASH | Ca ppm | K ppm | Na ppm |
|---|---|---|---|---|---|---|
| E | Nitrile Rubber (made from 67 percent by weight of Butadiene and 33 percent by weight of Acrylonitrile)[1] | ECH/DMA QUAT. (Low Mol. Wt.) Avg. of Two Tests | 0.10 0.10 0.10 | 77 87 82 | 7 7 7 | 50 53 52 |
| F | Nitrile Rubber (made from 67 percent by weight of Butadiene and 33 percent by weight of Acrylonitrile)[1] | CaCl₂ Avg. of Two Tests | 0.77 0.77 0.77 | 1544 1542 1541 | 60 60 60 | 502 505 504 |
| G | Nitrile Rubber (made from 67 percent by weight of Butadiene and 33 percent by weight of Acrylonitrile)[1] | MgSO₄ Avg. of Two Tests | 0.21 0.16 | 134 120 | 12 12 | 74 68 |
| H | Nitrile Rubber (made from 67 percent by weight of Butadiene and 33 percent by weight of Acrylonitrile)[1] | CaCl₂ Avg. of Two Tests | 0.78 0.75 0.77 | 1932 1018 1975 | 5 6 6 | 308 300 304 |
| I | Nitrile Rubber (made from 67 percent by weight of Butadiene and 33 percent by weight of Acrylonitrile)[1] | ECH/DMA QUAT. (Med. Mol. Wt.) | 0.04 0.02 | 64 72 | 5.6 4.4 | 18 24 |

| | RUBBER | COAGULANT | % ASH | Fe ppm | Mg ppm | S ppm |
|---|---|---|---|---|---|---|
| E | Nitrile Rubber (made from 67 percent by weight of Butadiene and 33 percent by weight of Acrylonitrile)[1] | ECH/DMA QUAT. (Low Mol. Wt.) Avg. of Two Tests | 0.10 0.10 0.10 | 7 5 6 | 18 24 21 | 134 179 157 |
| F | Nitrile Rubber (made from 67 percent by weight of Butadiene and 33 percent by weight of Acrylonitrile)[1] | CaCl₂ Avg. of Two Tests | 0.77 0.77 0.77 | 5 6 6 | 23 20 22 | 1532 1535 1533 |
| G | Nitrile Rubber (made from 67 percent by weight of Butadiene and 33 percent by weight of Acrylonitrile)[1] | MgSO₄ Avg. of Two Tests | 0.21 0.15 0.16 | 5 4 5 | 263 252 258 | 495 421 458 |
| H | Nitrile Rubber (made from 67 percent by weight of Butadiene and 33 percent by weight of Acrylonitrile)[1] | CaCl₂ Avg. of Two Tests | 0.78 0.75 0.77 | 4 4 4 | 42 42 42 | 1139 1188 1144 |
| I | Nitrile Rubber (made from 67 percent by weight of Butadiene and 33 percent by weight of Acrylonitrile)[1] | ECH/DMA QUAT. (Med. Mol. Wt.) | 0.04 0.02 | 3.7 2.8 | 14.2 16.0 | 70 72 |

| | RUBBER | COAGULANT | % ASH | P ppm | TOTAL ppm |
|---|---|---|---|---|---|
| E | Nitrile Rubber (made from 67 percent by weight of Butadiene and 33 percent by weight of Acrylonitrile)[1] | ECH/DMA QUAT (Low Mol. Wt.) Avg. of Two Tests | 0.10 0.10 0.10 | ND <10 <5 | 330 |
| F | Nitrile Rubber (made from 67 percent by weight of Butadiene and 33 percent by weight of Acrylonitrile)[1] | CaCl₂ Avg. of Two Tests | 0.77 0.77 0.77 | 7 10 9 | 3675 |
| G | Nitrile Rubber (made from 67 percent by weight of Butadiene and 33 percent by weight of Acrylonitrile)[1] | MgSO₄ Avg. of Two Tests | 0.21 0.15 0.16 | ND <10 <5 | 926 |
| H | Nitrile Rubber (made from 67 percent by weight of Butadiene and 33 percent by weight of Acrylonitrile)[1] | CaCl₂ Avg. of Two Tests | 0.78 0.75 0.77 | 258 235 247 | 3742 |
| I | Nitrile Rubber (made from 67 percent | ECH/DMA QUAT. (Med. Mol. Wt.) | 0.04 0.02 | 3.8 3.0 | 187 |

TABLE II-continued

The Composition of the Ash in Nitrile Rubber by weight of Butadiene
and 33 percent by weight
of Acrylonitrile)[1]

[1]Hycar 1052 manufactured by The BF Goodrich Company

As apparent from Table II, when calcium chloride or magnesium sulfate was utilized as an inorganic coagulant, significant high amounts of the various types of compounds indicated were obtained. In contrast thereto, when a cationic polymeric coagulant of the present invention was utilized, vast reductions in the amount of such compounds were obtained. Overall, the cationic polymeric coagulant of the present invention resulted in only 330 parts by weight of inorganic residues per million of nitrile rubber. In contrast, the prior art inorganic coagulants resulted in amounts well above 900 parts by weight of inorganic residues per million parts by weight of nitrile rubber. Hence, a reduction of at least 3 times and often in excess of 10 times in the amount of inorganic residues was obtained. All of the above examples were treated in the same manner including washing. When reduced amounts of cationic polymeric coagulants of the present invention was utilized, that is amounts generally below 0.75 weight equivalents for every weight equivalent of the total amount of said anionic emulsifying aids contained in the nitrile rubber emulsion latex was utilized, the latex could not be completely coagulated and product was thus lost.

The water resistance of nitrile rubber as prepared according to the present invention utilizing canionic coagulants was compared with the same compound of nitrile rubber recovered in a conventional manner, that is dried and subject to multiple washings.

The compounding recipes are as follows:

TABLE III

| COMPOUND | Nitrile Rubber Prepared According to the Present Invention | Nitrile Rubber Prepared via NaCl/ Acid and Washing |
|---|---|---|
| Hycar 1001LG* | 100 | — |
| Hycar 1001CG* | — | 100 |
| Zinc Oxide | 5.0 | 5.0 |
| Stearic Acid | 1.0 | 1.0 |
| Agerite Stalite | 1.5 | 1.5 |
| N774 | 65.0 | 65.0 |
| DOP | 15.0 | 15.0 |
| MBTS | 1.5 | 1.5 |
| Spider Sulfur | 1.5 | 1.5 |
|  | 190.5 | 190.5 |
| 1st BB Pass |  |  |
| Drop Temp °C. | 115 | 123 |
| Stock Temp °C. | 124 | 131 |
| Power Usage, KWH | 382 | 331 |
| Mix Time, Min. | 4.0 | 4.0 |
| 2nd BB Pass |  |  |
| Power US & GE, KWH | 127 | 121 |
| Mix time, Min. | 2.0 | 2.0 |
| Distilled H$_2$O, 70 hrs. @ 100° C. |  |  |
| Volume Change, % | +5.8 | +10.5 |
| Electrical Resistivity |  |  |
| OHM-CM | $2.9 \times 10^{10}$ | $1.6 \times 10^{10}$ |

*Nitrile rubber (made from 60 percent by weight of Butadiene and 40 percent by weight of Acrylonitrile) Manufactured by The BF Goodrich Company As apparent from the above data, the nitrile rubbers prepared according to the present invention utilizing cationic polymers result in a much less water swell and increased electrical resistivity than did otherwise conventionally prepared nitrile rubbers.

The cationic polymeric coagulants of the present invention resulted in nitrile-phenolic adhesives which had improved lap shear and peel strength as set forth in Table IV.

TABLE IV

Nitrile-Phenolic Adhesives
Two-Part
(Comparative Study of Hycar Nitrile Elastomers)

|  | NaCl/Acid Coagulant | Cationic Polymer | NaCl/Acid |
|---|---|---|---|
| PART A |  |  |  |
| Nitrile Rubber (made from 60 percent by weight of Butadiene and 40 percent by weight of Acrylonitrile)[1] | 50 |  |  |
| Nitrile Rubber (made from 60 percent by weight of Butadiene and 40 percent by weight of Acrylonitrile)[1] |  | 50 |  |
| Nitrile Rubber (made from 67 percent by weight of Butadiene and 33 percent by weight of Acrylonitrile)[1] |  |  | 50 |
| N-339 Black | 25 | 25 | 25 |
| Zinc Oxide | 2.5 | 2.5 | 2.5 |
| Stearic Acid | .25 | .25 | .25 |
| Sulfur | 1.5 | 1.5 | 1.5 |
| ALTAX (Thiazole Acc'l) | .75 | .75 | .75 |
| MEK/Toluene (75/25) | 240 | 240 | 240 |
| TOTAL (grams) | 320 | 320 | 320 |

TABLE IV-continued

| Nitrile-Phenolic Adhesives Two-Part (Comparative Study of Hycar Nitrile Elastomers) | | | |
|---|---|---|---|
| | NaCl/Acid Coagulant | Cationic Polymer | NaCl/Acid |
| PART B | | | |
| HRJ-2527 Resin | 100 | 100 | 100 |
| MEK/Toluene (75/25) | 220 | 220 | 220 |
| TOTAL (grams) | 320 | 320 | 320 |
| Lap Shear, psi [Average of Triplicate Runs] | 2470 | 2875 | 1620 |
| Peel, pli (metal to rubber) | 32 | 39 | 18 |

[1]Hycar 1022 manufactured by The BF Goodrich Company

As apparent from Table IV, the lap shear strength obtained utilizing the cationic polymeric coagulant of the present invention resulted in significant improvement as did the peel strength.

While in accordance with the Patent Statutes, the best mode and preferred embodiment has been set forth, the scope of the invention is not limited thereto, but rather by the scope of the attached claims.

What is claimed is:

1. A dried nitrile rubber composition, comprising:
a nitrile rubber composition, said nitrile rubber composition containing a reacted anionic emulsifying aid dispersed therein, said anionic emulsifying aid having been reacted with a cationic polymeric coagulant, said cationic polymeric coagulant being a quaternized poly (alkylene polyamine), a quaternized poly(hydroxy-alkylene polyamine), a quaternized poly(carabonyl-alkylene polyamine, or a quaternized polymer made from epichlorohydrin and a dialkylamine having from 1 to 5 carbon atoms, and wherein the amount of said cationic polymeric coagulant is from about 0.75 weight equivalents to about 1.5 weight equivalents for every weight equivalent of said emulsifying aid.

2. A dried nitrile rubber composition according to claim 1, wherein the amount of said cationic polymeric coagulant is from about 0.85 weight equivalents to about 1.25 weight equivalents for every weight equivalent of said anionic emulsifying aid.

3. A dried nitrile rubber composition according to claim 1, wherein the amount of said cationic polymeric coagulant is from about 0.95 weight equivalents to about 1.05 weight equivalents for every weight equivalent of said anionic emulsifying aid.

4. A dried nitrile rubber composition according to claim 1, wherein said cationic polymeric coagulant is a quaternized polymer made from epichlorohydrin and a dialkylamine having from 1 to 5 carbon atoms.

5. A dried nitrile rubber composition according to claim 2, wherein said cationic polymeric coagulant is a quaternized polymer made from epichlorohydrin and dimethylamine.

* * * * *